J. SOKOLOV.
STENCILING MACHINE.
APPLICATION FILED SEPT. 9, 1908.

959,268.

Patented May 24, 1910.
8 SHEETS—SHEET 1.

Witnesses:
W. Fritz.
John C. Seifert.

Inventor:
Jacob Sokolov,
By his Attorney
B. C. Stickney.

J. SOKOLOV.
STENCILING MACHINE.
APPLICATION FILED SEPT. 9, 1908.

959,268.

Patented May 24, 1910.
8 SHEETS—SHEET 6.

Witnesses:
W. Fritze
John C. Seifert

Inventor:
Jacob Sokolov,
By his Attorney
B. C. Stickney.

UNITED STATES PATENT OFFICE.

JACOB SOKOLOV, OF NEW YORK, N. Y., ASSIGNOR TO UNDERWOOD TYPEWRITER COMPANY, OF NEW YORK, N. Y., A CORPORATION OF NEW JERSEY.

STENCILING-MACHINE.

959,268.     Specification of Letters Patent.     Patented May 24, 1910.

Application filed September 9, 1908. Serial No. 452,330.

*To all whom it may concern:*

Be it known that I, JACOB SOKOLOV, a subject of the Czar of Russia, residing in borough of Brooklyn, New York city, in the county of Kings and State of New York, have invented certain new and useful Improvements in Stenciling-Machines, of which the following is a specification.

This invention relates generally to feeding devices, particularly to those for feeding sheets to printing or stenciling machines, and more especially to machines in which off-setting of ink from one printed sheet to another is likely to occur.

The invention is illustrated in connection with a stenciling machine.

One of the main objects of the invention is to provide simple and efficient means for guarding against off-setting of the ink from one stenciled sheet upon the back of another stenciled sheet. To this end the stencil sheet is interleaved. This is accomplished by feeding sheets from two piles concomitantly, to alternate with one another in the delivery pile.

The pile of sheets to be stenciled is preferably placed on one feedboard, and the pile of interleaving sheets is placed beneath them on another feedboard, and a duplex mechanism advances a sheet from each pile, at each revolution of the stencil cylinder.

The duplex sheet-advancing mechanism preferably comprises a roll running upon each of the two piles of sheets, said rolls being connected to a single carriage, and the latter connected to the stencil cylinder to cause the carriage and rolls to travel back and forth at every revolution of the cylinder.

Mechanism is provided to clamp the rear ends of the sheet piles, after the rolls have buckled the rear portions of the sheets and before the sheets are fed off from the piles; said clamping mechanism being of a duplex character but having a single pawl-and-ratchet trip mechanism.

The main sheets are fed between the stencil cylinder and the usual pressure roll; while the interleaving sheets are fed between an auxiliary pair of rolls, the upper of which runs in contact with said pressure roll. The interleaving sheets feed forwardly below the stencil cylinder and its pressure roll.

Other features and advantages will hereinafter appear.

In the accompanying drawings, Fig. 10 shows the parts in normal positions, and Fig. 11 shows the pressure roll cast off.

The stencil cylinder 1 is of the usual type and may be rotated either by a handle 2 or by a power shaft 3, by means of a sprocket wheel 4. A pressure roll 5, running upon the bottom of the cylinder, presses the sheets against the same to be stenciled.

At 6 is seen a pile of sheets to be stenciled, said sheets resting upon a table 7, and advanced one by one to the bight of the cylinder and pressure roll by means of a buckling and feeding roll 8. Said roll 8 is connected to a carriage or traveler 9, the latter in turn connected by a link 10 to a crank 11 fixed upon the drive shaft 3. The carriage is run back and forth in guide-ways 12, formed in opposite sides 13 of the framework. Said feeding roll 8 is carried upon a bail comprising a pair of arms 14 and a cross-bar 15, said bail hinged upon a shaft 16, the ends of which are guided in opposite horizontal slots 17 in the top of the framework 13. Said shaft 16 is connected by a pair of bars 18 to the ends of side frames of the carriage 9. The roll 8 of soft rubber is made of two sections, between which is secured a ratchet wheel 19, with which coöperates a spring pawl 20, fixed upon the cross bar 15, to prevent said roll from turning during its advance movement, and to permit it to roll idly upon the pile of sheets during its return movement.

As it is desired to leave one end of the stencil cylinder 1 entirely open for the introduction of an inking implement, it is preferred to use a single crank 11 and link 10 at only one side of the machine, for operating the carriage. Movement of the latter in parallelism and without binding is secured, however, by means of a pair of pinions 21 mounted at the ends of the carriage and fixed upon a revoluble shaft 22, and in mesh with a pair of racks 23 extending from front to rear and fixed upon the under side of the table 7; the shaft 22 being mounted in the ends or heads 9 of the carriage, whose free and accurate movement is thus secured even though it is driven only at one side.

The pile of interleaving sheets 24, preferably of the same dimensions as those in the pile 6, rests beneath the table 7 upon a table 25, and are buckled and fed forward by a roll 26 mounted upon a bail. The latter consists of arms 27 and a cross-bar 28, and is mounted upon a cross shaft 29, which at its ends is supported in bars 30 fixed at their rear ends to a cross rod 31 of the carriage frame, and also having guide blocks 32 to work in guide slots 33 of the sides 13 of the framing. The rubber roll 26 is also provided with a ratchet wheel 34 and pawl 35. The two rolls 8 and 26 travel together forwardly and backwardly with the carriage 9 at every revolution of the stencil cylinder.

At the completion of each return stroke of the roller carriage 9, clamping bars 36, 37 are raised from the rear ends of the piles of sheets, to permit the rolls to buckle the top sheets on the pile. These clamps may conveniently be secured at their ends to a pair of vertical racks 38, working in slides 39 at the rear of the machine, and meshing with pinions 40. The latter are fixed upon a horizontal revoluble shaft 41, journaled at its ends in hangers 42 on the framework, whereby the rack frame is caused to move up and down in parallelism. Upon the pinion shaft 41 is fixed a ratchet wheel 43, and an arm 44, hung loosely upon said shaft, carries a pawl 45, which is pressed by a spring 46 into engagement with said ratchet wheel. It will now be perceived that at the final portion of the return movement of the roller carriage 9 to the Fig. 4 position, said carriage strikes a shoulder 47 formed upon the arm 44, and thereby causes the pawl 45 to turn the ratchet wheel 43 and the pinion shaft 41, thereby lifting the racks 38 and the clamping bars 36, 37, preparatory to the buckling action of the rolls.

Figure 1:
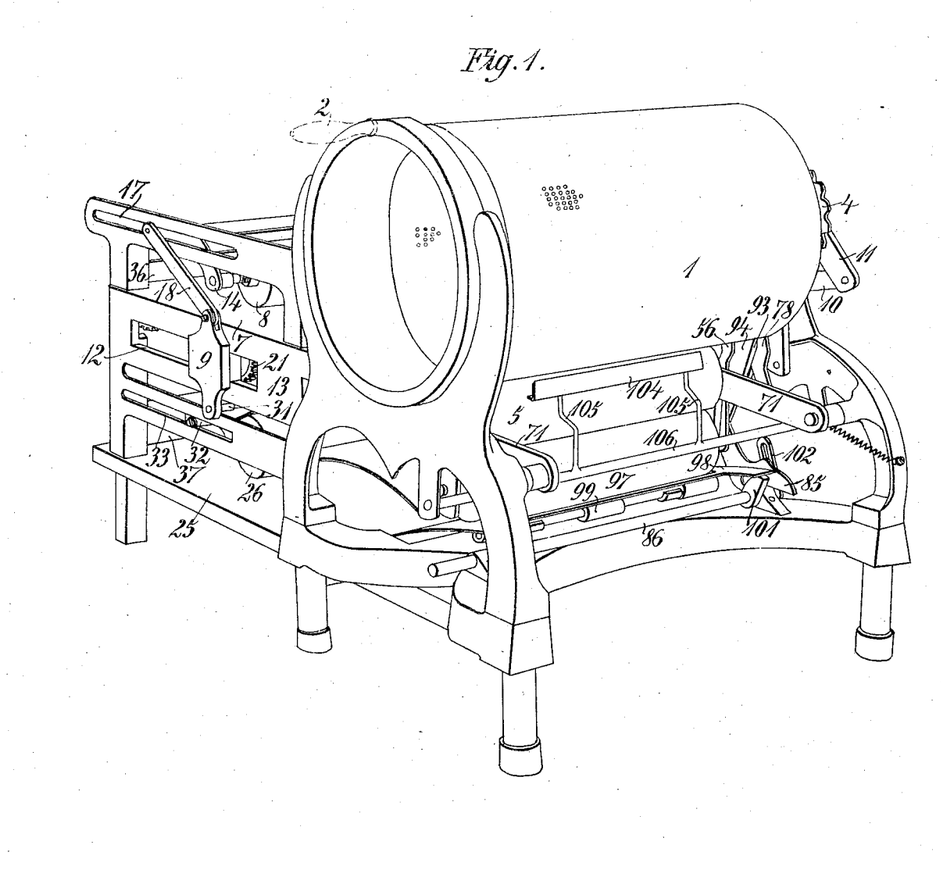
Figure 1 is a front perspective view of one form of machine embodying the present improvements.
Figure 2:
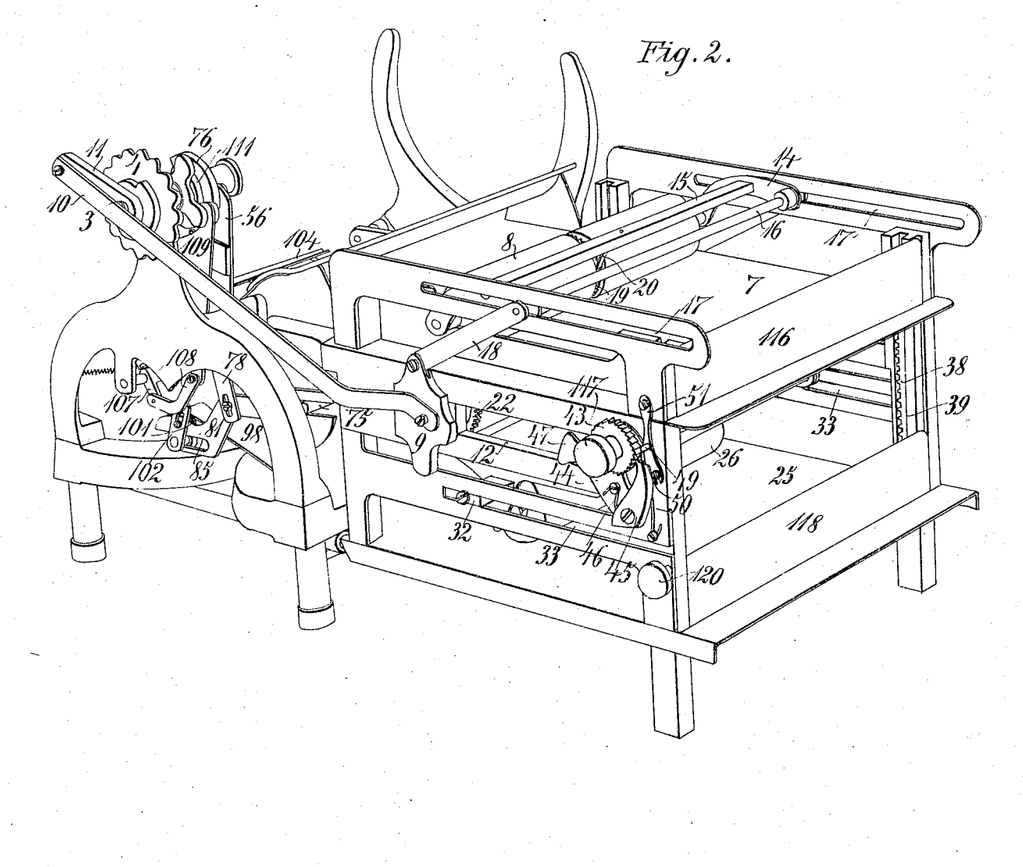
Fig. 2 is a rear perspective view of the same, embodying a stencil cylinder showing the feeding rolls at the completion of their advance stroke.
Figure 3:
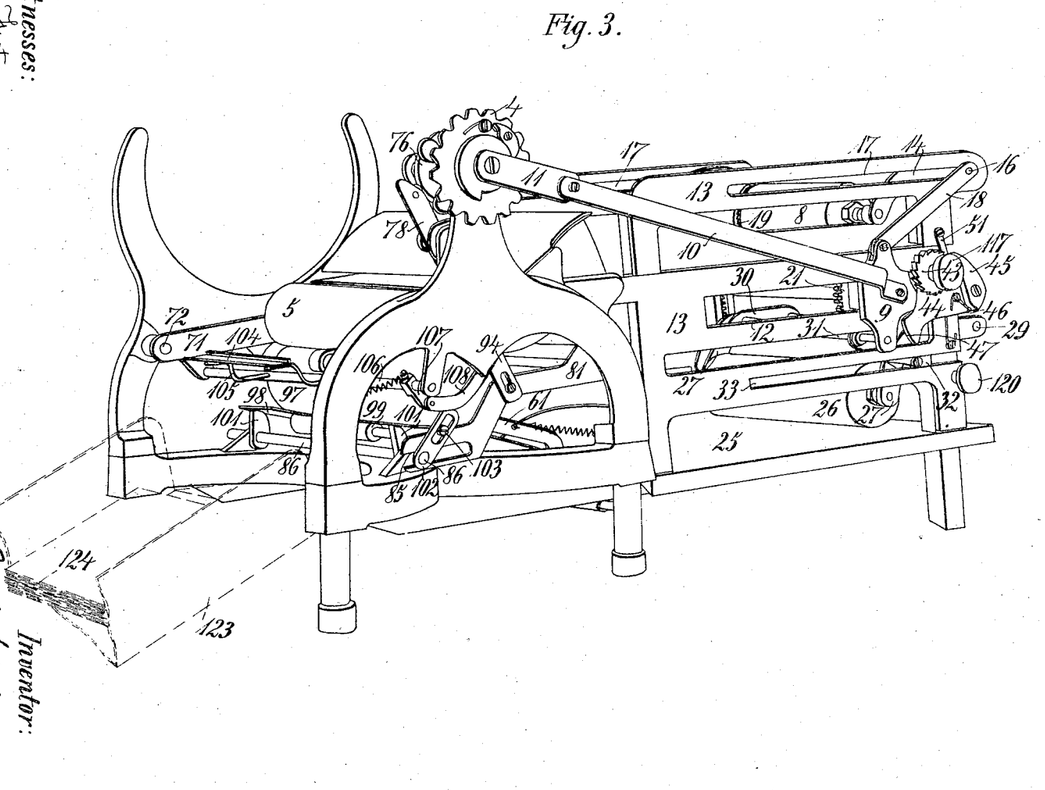
Fig. 3 is another perspective elevation, showing the feeding rolls at the beginning of their advance stroke.
Figure 4:
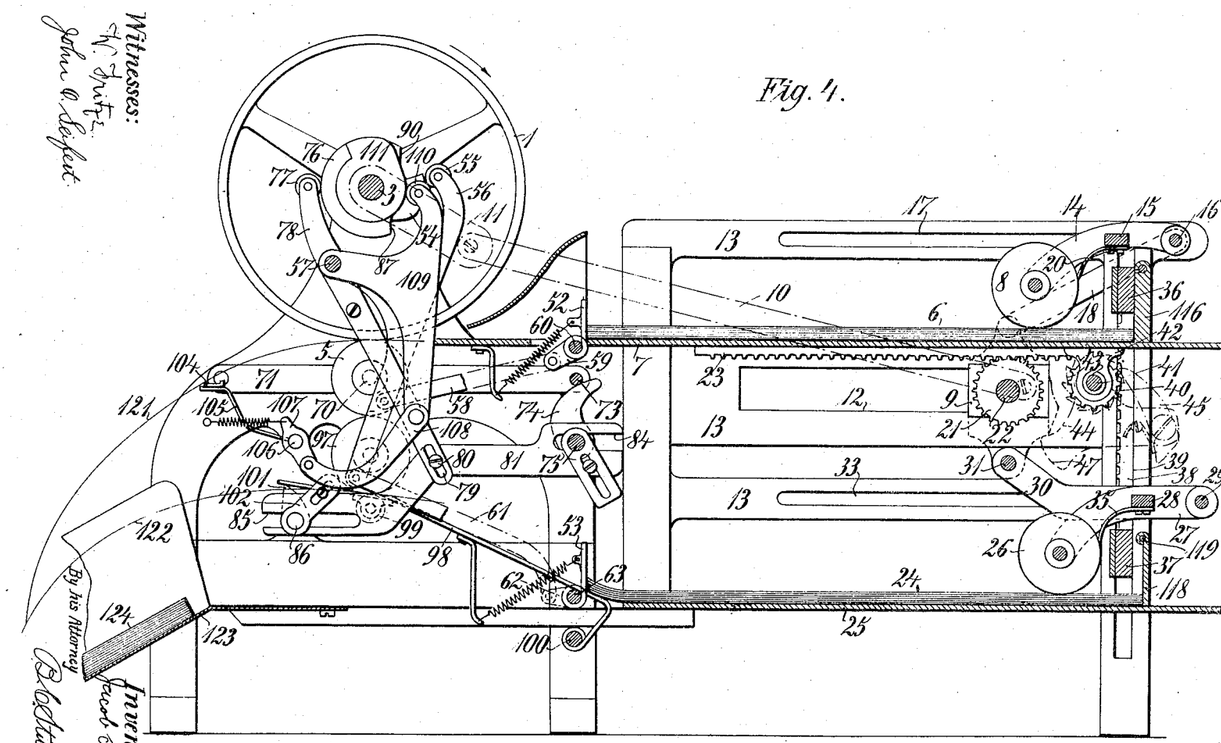
Fig. 4 is a sectional side elevation, showing the parts in about the same position as Fig. 3.
Figure 5:
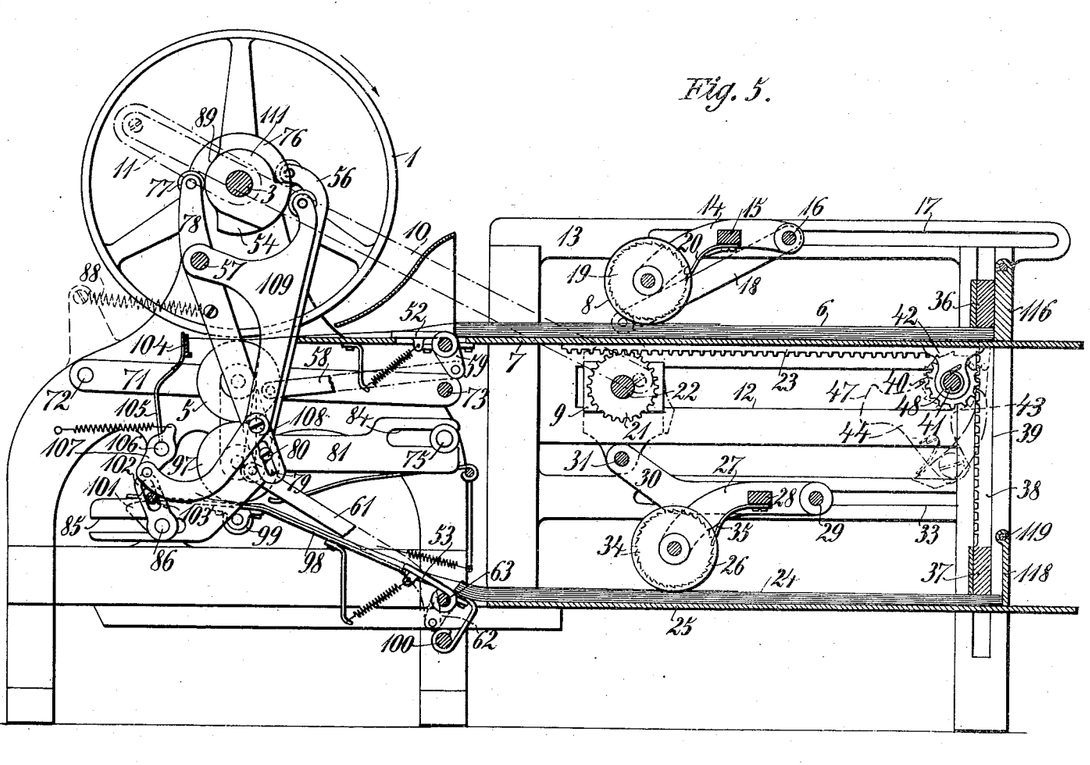
Fig. 5 is a view like Fig. 4, but showing the parts in the Fig. 2 position.

Upon the advance of the carriage from the Fig. 4 position toward the Fig. 5 position, the buckling rolls 8 and 26 buckle the top sheets on the piles, withdrawing their rear ends from beneath the clamps 36, 37. At the same time a spring 48 upon the pinion shaft 41 starts to return said shaft and its connected parts, including the ratchet wheel and the pawl. The latter is immediately tripped from the wheel by a pin 49, thus permitting the spring 48 to throw the clamps firmly down upon the sheets, to prevent creeping or advance movement thereof. It will be understood that the pawl 45 in rising, as aforesaid, passes freely by the trip pin 49, said pawl having a cam-face 50 to engage said pin and push it out of its path; the pin being carried upon a yielding mount 51 for this purpose. Although a single pawl and ratchet mechanism serves to release both clamps still the invention is not limited to a machine in which the clamps are rigidly connected. As soon as the sheets are buckled, the flaps 52, 53 are turned downwardly from the positions at Figs. 4 and 8 to the positions at Figs. 5 and 9, where they are out of the way of the advancing sheets, the latter passing over said flaps as illustrated at Fig. 5.

To control the flaps, there is provided upon the drive shaft 3 a cam-collar 54, on which runs a roll 55, pivoted upon the top of a lever 56, which is fulcrumed on a pin or stud 57 secured upon the framing. This lever is connected by one link 58 to an arm 59 projecting from a rock-shaft 60 which carries the upper flap 52; and by another link 61 to an arm 62 provided upon a rock-shaft 63 which carries the lower flap 53.

Figures 8, 9:
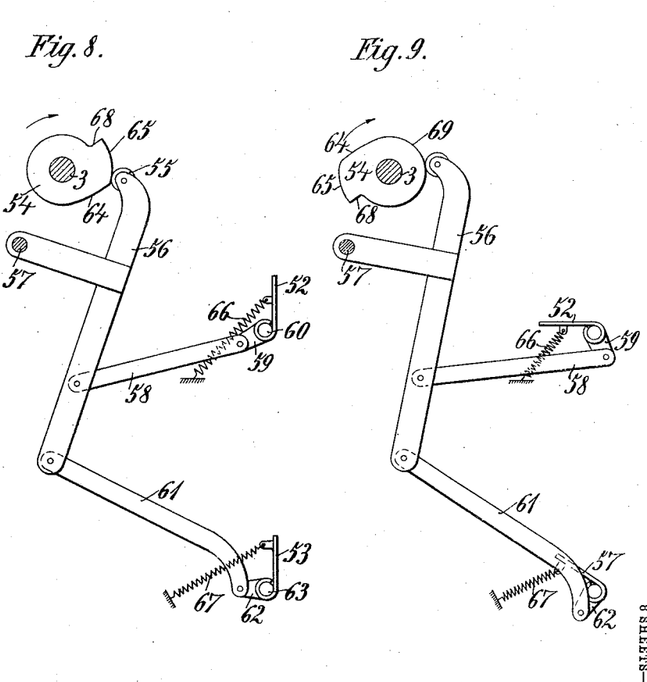
Fig. 8 is a detail view of a flap mechanism for jogging back the piles of sheets to overcome their tendency to creep forward; this mechanism also performing the function of restraining the piles from advancing while the rear clamps are released to permit the buckling of the top sheets in the two piles.
Fig. 9 is a view similar to Fig. 8, but showing the flaps as swung out of the way of the advancing sheets.

The collar 54 has an inclined cam-portion 64 to turn the lever 56 and rock the flaps up as at Fig. 8. Succeeding the cam portion 54 is a dwell-portion 65, to hold the flaps up temporarily; and at the moment when it is desired to advance the sheets over the flaps, the latter are drawn back by springs 66, 67, this movement being quick, owing to the sharp drop 68 at the terminus of the dwell 65 of the cam. The parts remain in the Fig. 9 position during the remainder of the cycle of operations; the roll 55 running idly upon an edge 69 of the collar formed concentrically with the drive shaft 3.

The sheet from the upper pile is advanced by the roll 8 to pass its leading edge between the stencil cylinder 1 and the pressure roll 5 beneath it. In order to enable the sheet to pass freely between said cylinder and pressure roll, the latter is automatically released for a short period. Said roll is provided with an axle 70, whose ends are journaled upon a pair of arms 71, the latter at their rear ends pivoted at 72 upon the framework of the machine, and at their forward ends connected by a transverse horizontal bar 73. By means of the latter, the arms 71 and the pressure roll 5 are first caused to drop and then to rise and press the sheet against the stencil cylinder. This effect is produced by a cam 74, engaging the bar 73 about midway the length of the latter, and fixed upon a rock-shaft 75. The rocking of this shaft, and consequently the up and down movements of the pressure-roll 5, are effected by a cam-collar 76 on the main drive shaft 3. A roll 77 running upon the edge of said collar is pivoted upon the top of a lever 78. The latter is pivoted upon the pin or stud 57, and at its lower end has a slot 79 to engage a pin 80 on a horizontal sliding bent bar or link 81. The latter has a pin 82 to engage a slotted arm 83 fixed on the rock-shaft 75; and as this link 81 rides backwardly and forwardly, it rocks shaft 75 and drops and raises the pressure roll 5. The link or bar 81 may have at its rear end a slot 84 to ride upon the shaft 75 and at its forward end a slot 85 to ride upon a bearing or shaft 86. During the principal portion of the revolution of the stencil cylinder 1, the roll 77 runs idly upon the collar 76; and at the proper time it runs into an abrupt depression 87 in said collar, permitting a spring 88 to turn said lever 78, to draw forwardly link 81 and turn backwardly the cam 74, to allow the pressure roll 5 to drop from the stencil cylinder.

While the sheet is being introduced between the pressure roll and the stencil cylinder, the roll 77 is running upon an idle portion 89 of the cam collar 76; and at the end thereof a cam-portion 90 engages the roll 77 and forces the parts to resume normal positions, the pressure roll 5 bearing against the under side of the stencil cylinder.

Figure 10:
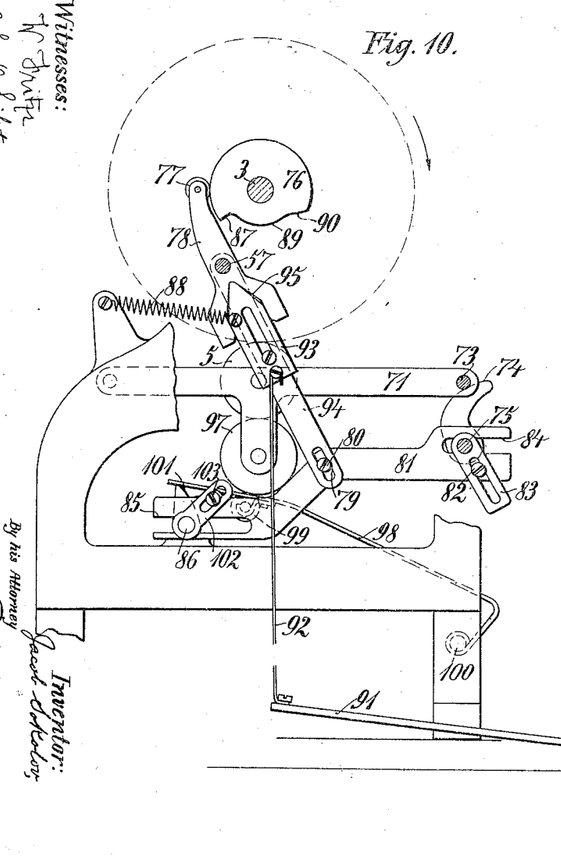
Figs. 10 and 11 show means for releasing the pressure roll automatically, to permit the sheet to pass forward between the pressure roll and the stencil cylinder and the gage; and also means to throw off the pressure roll at will to prevent it from becoming inked in case of failure of the sheet to feed forward into the bight of the pressure roll and cylinder. This throw-off is useful in some cases when the machine is power-driven; and it is also of advantage when it is desired to manipulate the stencil cylinder to fasten the stencil thereon, at which time the pressure roll should not run upon the cylinder.
Figure 11:
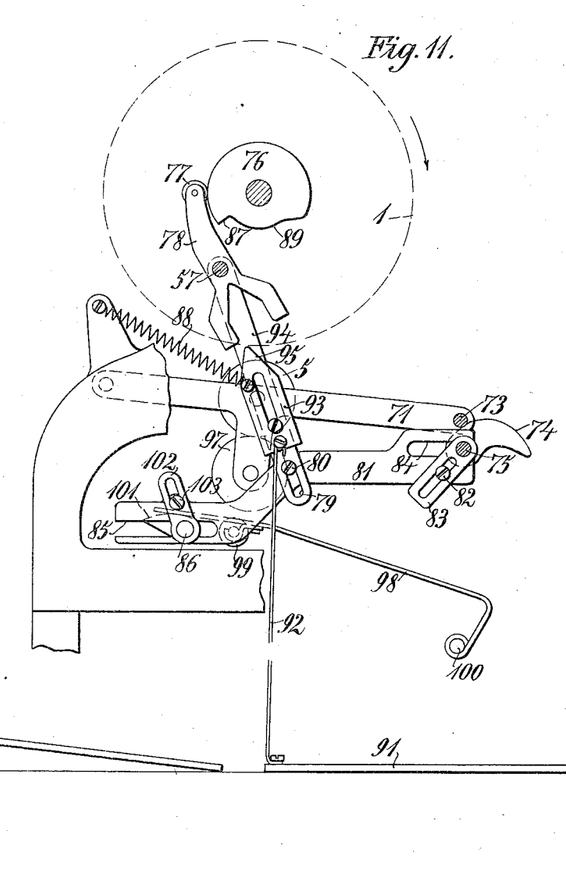

The pressure roll may be cast off at will by means of a treadle 91, Figs. 10 and 11, which is connected by a hook 92 to a sliding bolt 93 mounted upon the lower arm 94 of the lever 78. The upper end of said bolt is pointed, as at 95, to fit into a notch in the bottom part of the lever 78. The part 94 is pivoted to turn independently of the lever 78, and when the point 95 is pulled down out of the notch, the spring 88 serves to swing the arm 94 forwardly to the Fig. 11 position, thereby carrying the link or bar 81 forwardly and turning the cam 74 to cast off the pressure roll 5. This cast off is of advantage when the machine is power driven, as by running a chain from a driving sprocket to a sprocket 4 carried upon the drive shaft 3. In case a sheet fails to enter between the pressure roll and the stencil cylinder, the pressure roll may be cast off instantly by depressing the treadle before the stencil cylinder comes to rest, so as to avoid the making of an inked impression upon the surface of the pressure roll 5, which would be an objection. The cast-off mechanism is also an advantage when a stencil cylinder is being manipulated to secure the stencil sheet thereto. Also hung upon the pressure roll arm 71, and running in contact with the pressure roll itself, to be revolved thereby, is a roll 97, for advancing the interleaving sheets from the bottom pile 24. These interleaving sheets are buckled and advanced from the lower pile in the same manner as the sheets from the upper pile, and the former are run up an inclined feedboard 98 and pass between said roll 97 and a bottom roll or rolls 99, the latter mounted upon the under side of the feedboard and projecting up therethrough to bear against the under side of the roll 97.

The feed-board 98 is swiveled at its rear end upon a horizontal shaft 100 mounted in the framework, and at its forward portion is extended past the roll or rolls 99, to rest upon a pair of cams 101 fixed upon the rock shaft 86. Also fixed upon said rock shaft is a slotted arm 102, engaged by a pin 103 on the bent link or bar 81; so that when the main pressure roll 5 is dropped, the cam or cams 101 also turn forwardly and downwardly to drop the feed-board 98 together with the roll 99 mounted thereon; the desired movement of the latter being in excess of that of the roll 97, so that a space is formed between 97 and 99 to admit the leading edge of the interleaving sheet as the latter is advanced by the traveling feed roll 26. When the cam 90 forces the lever 78 back to normal position, the cams 101 are turned up to cause the roll 99 to press the interleaving sheet against the roll 97. Thus while the upper sheet is being stenciled upon, the lower sheet is being advanced past the stencil cylinder, to be deposited upon the last stenciled sheet, while the sheet now being stenciled upon will be deposited upon said interleaving sheet.

Figure 6:
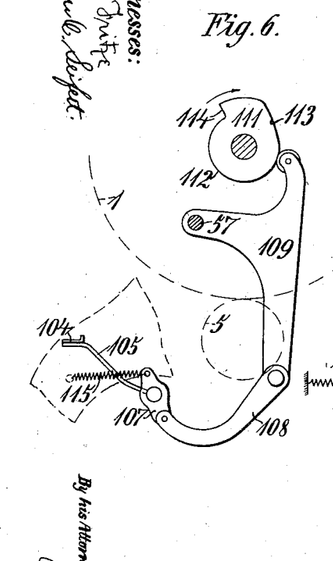
Fig. 6 is a detail of the mechanism for gaging the leading edges of the sheets to be stenciled, showing the gage in inoperative position.
Figure 7:
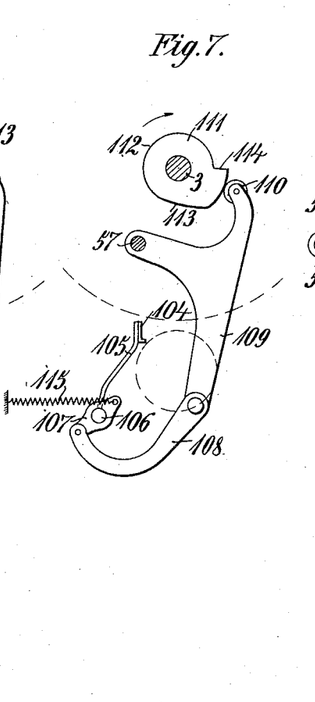
Fig. 7 is a view similar to Fig. 6, but showing the gage in operative position.

Upon the top sheet being advanced between the released pressure roll and the stencil cylinder 1, and just before the roll rises to bite the sheet, the latter is arrested by a gage bar 104, which is mounted upon a pair of arms 105 rising from a rock-shaft 106. By this means the sheet is registered, so that the stenciled matter may always fall upon the successive sheets at the same distance from the top. Said rock-shaft 106 carries an arm 107, which is connected by a link 108 to a link 109 pivoted upon the stud 57, and having a roll 110 to run upon a cam collar 111 fixed upon the drive shaft 3. Normally said roll 110 runs idly upon a portion 112 of said collar which is concentric to the drive-shaft 31; the gage 104 being at this time swung forwardly and downwardly out of the way as at Fig. 6; but at the proper moment a cam 113 on said collar 111 turns the lever 109 to swing the gage up to the Fig. 7 position, to gage the sheet, as already explained. As soon as this is done, the roll 110 runs into a depression 114 formed on said cam collar, and the spring 115 restores the parts to normal Fig. 6 position.

Figures 12, 13:
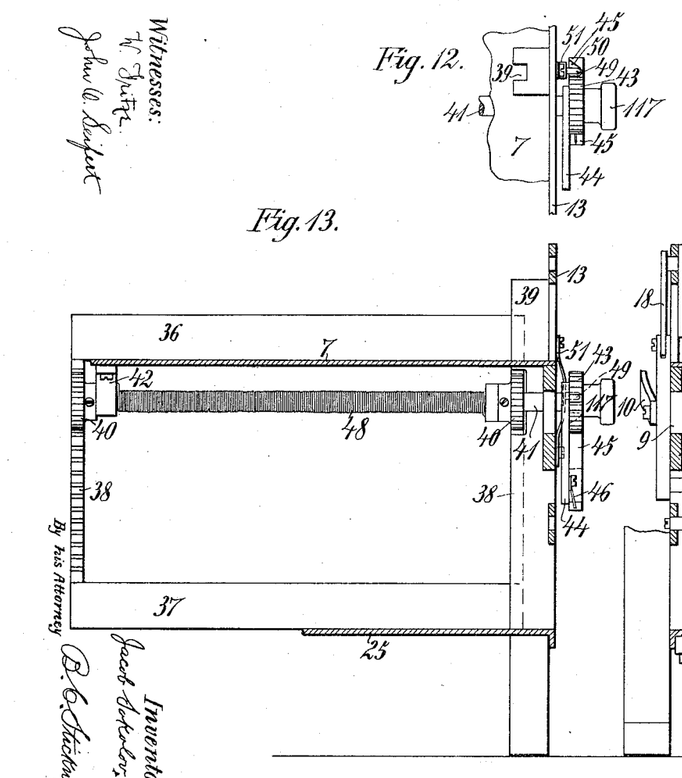
Fig. 12 is a detail plan of a pawl and ratchet mechanism which releases the paper pile from the clamps, and the trip which releases the pawl from the ratchet.
Fig. 13 is a sectional front elevation of the rear portion of the machine, showing particularly the paper clamp mechanism.
Figure 14:
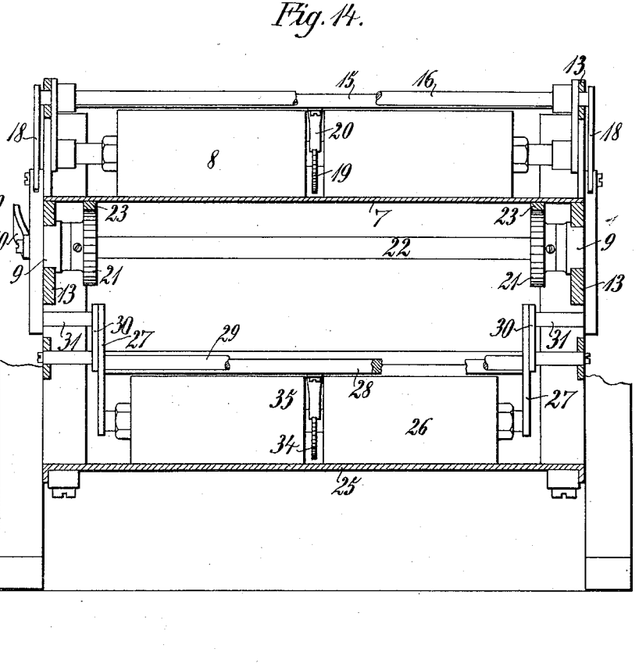
Fig. 14 is a sectional rear view of the rear portion of the machine, showing the sheet-buckling and feeding rollers and the carriage to which they are attached.

In operation the roll 8 is lifted about the hinge 16 and the upper pile of sheets 6, to be stenciled upon, is laid upon the table 7 with its back edge against a rear gage 116; a hand wheel 117 being first rotated to lift the clamping bar frame to permit insertion of the piles of sheets beneath the clamping bars; said hand wheel 117 being fixed upon the pinion shaft 41. Then a rear gage 118 at the bottom of the machine is turned up about a hinge 119 to permit the pile of sheets 24 to be introduced; the roll 26 being held up while the sheets are going in. The gage 118 is then turned down and secured firmly by a thumb nut or screw 120 or other means. The rolls 8 and 26 are then dropped upon the sheets, and the machine is started in operation. The carriage 9 is drawn forwardly from the Fig. 4 position to the Fig. 5 position; and during the first part of such movement the rolls 8 and 26 buckle the top sheets of the piles. After the rear edges of the top sheets have been withdrawn from the clamps 36, 37, the trip pin 49, Fig. 12, causes the pawl 35 to release the ratchet wheel 43, so that the spring 48 causes the clamps to fall upon the remaining sheets in the two piles to prevent them from creeping forwardly. During the further advance of the carriage, the flaps 52 and 53 are thrown down from the Fig. 4 to the Fig. 5 position, and the buckled sheets advanced thereover, the top one passing between the stencil cylinder 1 and the pressure roll 5, and the bottom one between the upper and lower feeding rolls 97 and 99. The top sheet is gaged by means of the gage 104, Fig. 5, and the gage drops back to the Fig. 4 position.

To facilitate introduction of the sheet, the roll 5 is thrown off to the Fig. 5 position, and simultaneously the roll 99 separated from the roll 97; but after the sheets have entered the bights of the rolls the latter are restored to normal positions, and the sheets fed forwardly as at 121 and 122, the former becoming stenciled in the usual manner. The sheets then fall onto a delivery table 123 forming a pile 124. It will be seen that the interleaving sheet 122 drops upon the previously stenciled sheet, while the sheet now stenciled drops upon said interleaving sheet.

While the sheets are advancing from the Fig. 5 position and being delivered, the carriage 9 with its rolls 8 and 26 runs backwardly to initial position, and during the last part of its movement, the carriage strikes the shoulder 47 on the arm 44 that releases the clamping mechanism, and both clamps are lifted from the piles.

Variations may be resorted to within the scope of the invention, and portions of the improvements may be used without others.

Having thus described my invention, I claim:

1. A sheet-feeding mechanism comprising a framework, a reciprocating carriage guided upon the framework, a pair of racks fixed upon the framework at the ends of the carriage, a pair of pinions meshing with said racks, a shaft upon which said pinions are fixed, said shaft journaled upon said carriage, and upper and lower sheet-feeding rolls attached to said carriage to run respectively upon upper and lower piles of sheets.

2. A sheet-feeding mechanism comprising a framework, a reciprocating carriage guided upon the framework, a pair of racks fixed upon the framework at the ends of the carriage, a pair of pinions meshing with said racks, a shaft upon which said pinions are fixed, said shaft journaled upon said carriage, upper and lower sheet-feeding rolls attached to said carriage to run respectively upon upper and lower piles of sheets, a power-driven shaft having a crank, and a link connecting said crank to said carriage.

3. A sheet-feeding mechanism comprising a framework, a reciprocating carriage guided upon the framework, a pair of racks fixed upon the framework at the ends of the carriage, a pair of pinions meshing with said racks, a shaft upon which said pinions are fixed, said shaft journaled upon said carriage, upper and lower sheet-feeding rolls attached to said carriage to run respectively upon upper and lower piles of sheets, and means connected only to one end of the carriage for driving the same.

4. In a sheet-feeding mechanism, the combination with a sheet-feeding roller carriage, of an actuator in the path of a part of said carriage to be engaged thereby at the final portion of the feeding movement of the carriage, a pawl driven by said actuator, a ratchet operated by said pawl, paper-pile clamps lifted by the ratchet from upper and lower piles of sheets, and means for tripping the pawl from the ratchet during the return stroke of said actuator at the initial portion of the advance movement of said carriage.

5. A stenciling or printing machine having a stencil cylinder and means coöperating therewith to deliver the sheets as they are stenciled or printed upon, and an interleaving sheet-feeding mechanism upon the introductory side of the machine and including a table to receive the pile, a pair of feeding rolls, and means to advance the sheets to said rolls, the interleaving mechanism being constructed, arranged and timed to carry the sheets past the stencil cylinder to the delivery side thereof to alternate with the sheets delivered by the stenciling or printing machine.

6. A stenciling or printing machine including an impression cylinder and a roll to press the sheets against the cylinder, and an interleaving sheet-feeding mechanism including a pair of rolls one of which runs in contact with said pressure roll, and means connected to said impression cylinder to feed the sheets to said pair of rolls to be interleaved thereby with the sheets delivered by the stenciling machine.

7. A stenciling or printing machine having an impression cylinder and a feed board for the sheets to be stenciled upon, in combination with a separate feed-board beneath the first for interleaving sheets, mechanism connected to the stenciling machine for buckling and advancing the interleaving sheets, and means to convey them past said impression cylinder to the delivery side of the stenciling machine, to interleave the sheets which are stenciled upon, said conveying means including a pair of rolls to which the sheets are delivered by the buckling and advancing mechanism.

8. A stenciling or printing machine having an impression cylinder and a feed board for the sheets to be stenciled upon, in combination with a separate feed-board for interleaving sheets, mechanism connected to the stenciling machine for buckling and advancing the interleaving sheets, and means to convey them to the delivery side of the stenciling machine, to interleave the sheets which are stenciled upon, said conveying means including a pair of rolls to which the sheets are delivered by the buckling and advancing mechanism, and said pair of rolls being arranged below said impression cylinder, to advance the interleaving sheets past said cylinder to the delivery side thereof.

9. A stenciling or printing machine having an impression cylinder and a feed board for the sheets to be stenciled upon, in combination with a separate feed-board for interleaving sheets, mechanism connected to the stenciling machine for buckling and advancing the interleaving sheets, and means to convey them to the delivery side of the stenciling machine, to interleave the sheets which are stenciled upon, said conveying means including a pair of rolls to which the sheets are delivered by the buckling and advancing mechanism, and one roll of said pair running in contact with a roll which is pressed against said cylinder to make the inked impressions on the paper.

10. A stenciling or printing machine or the like provided with a stenciling or printing couple and having at the introductory side of the machine means to support a pile of sheets to be stenciled upon, a mechanism for mechanically feeding said sheets, a second support also upon the introductory side of the machine for a pile of interleaving sheets, and a pair of rolls or feeders operatively connected to the stencil cylinder to carry the interleaving sheets past the stenciling or printing couple to the delivery side of the stencil cylinder, to interleave the sheets stenciled upon.

11. A stenciling or printing machine comprising a stenciling or printing couple and having means to mechanically feed sheets thereto and to deliver sheets as they are stenciled or printed upon, in combination with a second sheet-feeding mechanism connected to said machine and including a table on the introductory side of the machine to receive a pile of interleaving sheets, a pair of feeding rolls, and means to advance the interleaving sheets past said printing couple to said rolls concomitantly with the advance of the sheets to be stenciled.

12. A stenciling or printing machine including an impression cylinder and a roll to press the sheets against the cylinder, a mechanism into feed sheets from pile to said cylinder and roll, and an interleaving sheet-feeding mechanism including a pair of rolls, one of which runs in contact with said pressure roll, and means connected to said impression cylinder to feed the interleaving sheets to said pair of rolls concomitantly with the sheets fed to said impression cylinder.

13. In a stenciling or printing machine having two feed boards, one beneath the other, one for sheets to be stenciled upon, and the other for interleaving sheets, and two sheet-feeding mechanisms having a common carriage or driver which is operatively connected to said machine, and each including means for buckling and advancing the sheets.

14. A stenciling or printing machine having an impression cylinder and a feed-board for the sheets to be stenciled upon, in combination with a separate feed board for interleaving sheets, mechanisms operatively connected to the stenciling machine for concomitantly buckling and advancing sheets from both piles, and to convey the sheet from one pile to the stenciling cylinder and the sheet from the other pile from the introductory side past the stenciling cylinder to the delivery side of the stenciling machine to interleave the stenciled sheets.

15. A stenciling or printing machine having an impression cylinder and a feed-board for the sheets to be stenciled upon, in combination with a separate feed board for interleaving sheets, mechanisms operatively connected to the stenciling machine for concomitantly buckling and advancing sheets from both piles, and to convey the sheet from one pile to the stenciling machine and the sheet from the other pile from the introductory side past said impression cylinder to the delivery side of the stenciling machine to interleave the stenciled sheets, the interleaving sheet-feeding mechanism including a pair of rolls to which the sheets are delivered by its buckling and advancing mechanism.

16. A stenciling or printing machine having an impression cylinder and a feed-board for the sheets to be stenciled upon, in combination with a separate feed board for interleaving sheets, mechanisms operatively connected to the stenciling machine for concomitantly buckling and advancing sheets from both piles, and to convey the sheet from one pile to the stenciling machine and the sheet from the other pile to the delivery side of the stenciling machine to interleave the stenciled sheets, the interleaving sheet-feeding mechanism including a pair of rolls to which the sheets are delivered by its buckling and advancing mechanism, and said pair of rolls being arranged below said impression cylinder, to advance the interleaving sheets past said cylinder to the delivery side thereof.

17. A stenciling or printing machine having an impression cylinder and a feed-board for the sheets to be stenciled upon, in combination with a separate feed board for interleaving sheets, mechanisms operatively connected to the stenciling machine for concomitantly buckling and advancing sheets from both piles, and to convey the sheet from one pile to the stenciling machine and the sheet from the other pile to the delivery side of the stenciling machine to interleave the stenciled sheets, the interleaving sheet-feeding mechanism including a pair of rolls to which the sheets are delivered by its buckling and advancing mechanism, one roll of said pair running in contact with a roll which is pressed against said cylinder to make the inked impressions on the paper.

18. A stenciling or like machine having a drive-shaft, in combination with supports for two separate superposed piles of sheets, and duplex sheet-feeding mechanism upon the introductory side of the machine and including a pair of buckling and advancing rolls, one for each pile, and a device operated by said drive shaft and common to said rolls to operate the same concomitantly.

19. In a stenciling or like machine, the combination of a drive-shaft, a single carriage connected to said drive-shaft, and buckling and advancing rolls all connected to said carriage to feed sheets from separate superposed piles simultaneously.

20. In a stenciling or like machine, the combination of a drive-shaft, a carriage connected to said drive-shaft, buckling and advancing rolls connected to said carriage to feed sheets from separate piles simultaneously, one of said rolls to feed sheets to the stenciling machine and the other to feed interleaving sheets past the stenciling machine to the delivery side thereof.

21. In a stenciling machine, the combination with a stencil cylinder having a drive-shaft, of a carriage, a link connecting said carriage to a crank on the drive-shaft, and a pair of buckling rolls connected to said carriage, one to feed sheets to be stenciled upon and the other to feed interleaving sheets.

22. In a stenciling machine, the combination with a stencil cylinder having a drive-shaft, of a carriage, a link connecting said carriage to a crank on the drive-shaft, and a pair of buckling rolls connected to said carriage, one to feed sheets to be stenciled upon and the other to feed interleaving sheets, an upper shelf or table being provided to hold the sheets to be stenciled upon, and a lower shelf or table for the interleaving sheets.

23. In a stenciling machine, the combination with a stencil cylinder having a drive-shaft, of a carriage, a link connecting said carriage to a crank on the drive-shaft, a pair of buckling rolls connected to said carriage, one to feed sheets to be stenciled upon and the other to feed interleaving sheets, an upper shelf or table being provided to hold the sheets to be stenciled upon, and a lower shelf or table for the interleaving sheets, and guides for said carriage being provided adjacent to said tables at the sides thereof.

24. In a stenciling machine, the combination with a stencil cylinder having a drive-shaft, of a carriage, a link connecting said carriage to a crank on the drive-shaft, and a pair of buckling rolls, one to feed sheets to be stenciled upon and the other to feed interleaving sheets, and said rolls mounted on bails which are hinged to said carriage.

25. In a stenciling machine, the combination with a stencil cylinder having a drive-shaft, of a carriage, a link connecting said carriage to a crank on the drive-shaft, a pair of buckling rolls connected to said carriage, one to feed sheets to be stenciled upon and the other to feed interleaving sheets, an upper shelf or table being provided to hold the sheets to be stenciled upon, and a lower shelf or table for the interleaving sheets, and flaps operated by said drive-shaft for pressing and holding back the front edges of the sheets in the upper and lower piles.

26. In a stenciling machine, the combination with a stencil cylinder having a drive-shaft, of a carriage, a link connecting said carriage to a crank on the drive-shaft, a pair of buckling rolls connected to said carriage, one to feed sheets to be stenciled upon and the other to feed interleaving sheets, an upper shelf or table being provided to hold the sheets to be stenciled upon, and a lower shelf or table for the interleaving sheets, flaps operated by said drive-shaft for pressing and holding back the front edges of the sheets in the upper and lower piles, and a clamping mechanism for the rear portions of said upper and lower piles.

27. In a stenciling machine, the combination with a stencil cylinder having a drive-shaft, of a carriage, a link connecting said carriage to a crank on the drive-shaft, a pair of buckling rolls connected to said carriage, one to feed sheets to be stenciled upon and the other to feed interleaving sheets, an upper shelf or table being provided to hold the sheets to be stenciled upon, and a lower shelf or table for the interleaving sheets, flaps operated by said drive-shaft for pressing and holding back the front edges of the sheets in the upper and lower piles, a clamping mechanism for the rear portions of said upper and lower piles, said clamping mechanism including a pair of racks, upper and lower clamps connected to said racks, pinions fixed upon a revoluble shaft and meshing with said racks, a ratchet wheel also fixed upon said shaft, a pawl operated by said drive shaft for turning said ratchet wheel to lift the clamps, and a trip for the pawl, and means for pressing the clamps down upon the sheets when the pawl is released.

28. In a stenciling machine, the combination with a stencil cylinder having a drive-shaft, of a carriage, a link connecting said carriage to a crank on the drive-shaft, a pair of buckling rolls connected to said carriage, one to feed sheets to be stenciled upon and the other to feed interleaving sheets, and flaps operated by said drive-shaft for pressing and holding back the front edges of the sheets in the upper and lower piles.

29. In a stenciling machine, the combination with a stencil cylinder having a drive-shaft, of a carriage, a link connecting said carriage to a crank on the drive-shaft, a pair of buckling rolls connected to said carriage, one to feed sheets to be stenciled upon and the other to feed interleaving sheets, flaps operated by said drive-shaft for pressing and holding back the front edges of the sheets in the upper and lower piles, and a clamping mechanism for the rear portions of said upper and lower piles.

30. In a stenciling machine, the combination with a stencil cylinder having a drive-shaft, of a carriage, a link connecting said carriage to a crank on the drive-shaft, a pair of buckling rolls connected to said carriage, one to feed sheets to be stenciled upon and the other to feed interleaving sheets, flaps operated by said drive-shaft for pressing and holding back the front edges of the sheets in the upper and lower piles, a clamping mechanism for the rear portions of said upper and lower piles, said clamping mechanism including a pair of racks, upper and lower clamps connected to said racks, pinions fixed upon a revoluble shaft and meshing with said racks, a ratchet wheel also fixed upon said shaft, a pawl operated by said drive shaft for turning said ratchet wheel to lift the clamps, and a trip for the pawl.

31. In a stenciling machine, the combination with a stencil cylinder having a drive-shaft, of a carriage, a link connecting said carriage to a crank on the drive shaft, an upper buckling roll connected to said carriage, to feed sheets to be stenciled upon, a lower buckling roll also connected to said carriage to feed interleaving sheets, an upper shelf or table being provided to hold the sheets to be stenciled upon, and a lower shelf or table for the interleaving sheets, and a clamping mechanism for the rear portions of said upper and lower piles.

32. In a stenciling machine, the combination with a stencil cylinder having a drive-shaft, of a carriage, a link connecting said carriage to a crank on the drive shaft, an upper buckling roll connected to said carriage, to feed sheets to be stenciled upon, a lower buckling roll also connected to said carriage to feed interleaving sheets, an upper shelf or table being provided to hold the sheets to be stenciled upon, and a lower shelf or table for the interleaving sheets, a clamping mechanism for the rear portions of said upper and lower piles, said clamping mechanism including a pair of racks, upper and lower clamps connected to said racks, pinions fixed upon a revoluble shaft and meshing with said racks, a ratchet wheel also fixed upon said shaft, a pawl operated by said drive-shaft for turning said ratchet wheel to lift the clamps, and a trip for the pawl.

33. The combination with an impression cylinder, of upper and lower sheet-feeding tables for separate piles of sheets, a common driver, duplex sheet-feeding devices connected thereto for taking sheets simultaneously from the piles and advancing them concomitantly to the delivery side of the machine, and gages for the rear ends of the piles of sheets.

34. The combination with an impression cylinder, of upper and lower sheet-feeding tables for separate piles of sheets, duplex sheet-feeding devices, and gages for the rear ends of the piles of sheets, the lower gage movable to permit insertion of the pile.

35. The combination with an impression cylinder, of upper and lower sheet-feeding tables for separate piles of sheets, duplex sheet-feeding devices, and gages for the rear ends of the piles of sheets, said sheet-feeding devices including duplex sheet-buckling rolls and duplex clamping mechanism for the rear ends of the upper and lower piles of sheets.

36. The combination with an impression cylinder, of upper and lower sheet-feeding tables for separate piles of sheets, duplex sheet-feeding devices, and gages for the rear ends of the piles of sheets, said sheet-feeding devices including duplex sheet-buckling rolls and clamping mechanism for the rear ends of the upper and lower piles of sheets, said clamping mechanism including upper and lower clamps and a pawl and ratchet wheel mechanism to release both piles.

37. The combination with an impression cylinder, of upper and lower sheet-feeding tables for separate piles of sheets, duplex sheet-feeding devices, and gages for the rear ends of the piles of sheets, said sheet-feeding devices including duplex sheet-buckling rolls and clamping mechanism for the rear ends of the upper and lower piles of sheets, said clamping mechanism including upper and lower clamps and a pawl and ratchet wheel mechanism to release both piles, and a finger-piece connected to said ratchet wheel, whereby both clamps can be raised to permit insertion of the piles of sheets.

38. The combination with an impression cylinder, of upper and lower sheet-feeding tables for separate piles of sheets, duplex sheet-feeding devices, and gages for the rear ends of the piles of sheets, said sheet-feeding devices including duplex sheet-buckling rolls and clamping mechanism for the rear ends of the upper and lower piles of sheets, said clamping mechanism including upper and lower clamps and a pawl and ratchet wheel mechanism to release both piles, means being provided to cause said pawl to turn said ratchet and lift the clamps to permit the buckling of the sheets, and means to trip the pawl, to cause the remaining sheets in the piles to be clamped.

39. The combination with an impression cylinder, of upper and lower sheet-feeding tables for separate piles of sheets, duplex sheet-feeding devices, and gages for the rear ends of the piles of sheets, said sheet-feeding devices including duplex sheet-buckling rolls and clamping mechanism for the rear ends of the upper and lower piles of sheets, said clamping mechanism including upper and lower clamps and a pawl and ratchet wheel mechanism to release both piles, means being provided to cause said pawl to turn said ratchet and lift the clamps to permit the buckling of the sheets, means to trip the pawl to cause the remaining sheets in the piles to be clamped, and a finger-piece connected to said ratchet wheel, whereby both clamps can be raised to permit insertion of the pile of sheets.

40. The combination with an impression cylinder, of upper and lower sheet-feeding tables for separate piles of sheets, duplex sheet-feeding devices, and gages for the rear ends of the piles of sheets, said sheet-feeding devices including duplex sheet-buckling rolls and clamping mechanism for the rear ends of the upper and lower piles of sheets, said clamping mechanism including upper and lower clamps and a pawl and ratchet wheel mechanism to release both piles, means being provided to cause said pawl to turn said ratchet and lift the clamps to permit the buckling of the sheets, means to trip the pawl to cause the remaining sheets in the piles to be clamped, said clamps connected at their ends by means of a pair of vertical racks, pinions meshing with said racks, and a shaft carrying said pinions and said ratchet wheel.

41. The combination with an impression cylinder, of upper and lower sheet-feeding tables for separate piles of sheets, duplex sheet-feeding devices, and gages for the rear ends of the piles of sheets, the lower gage movable to permit insertion of the pile, means being provided to lock the lower rear gage in operative position.

42. The combination with an impression cylinder and sheet-feeding devices for upper and lower piles of sheets, of clamps for the rear ends of the piles of sheets, a ratchet wheel to release both clamps, a pawl for said ratchet wheel, and a finger-piece connected to said ratchet wheel, mechanism being provided to cause said pawl to turn said ratchet and lift the clamps to permit the advance of the sheets.

43. The combination with an impression cylinder and sheet-feeding devices for upper and lower piles of sheets, of clamps for the rear ends of the piles of sheets, a ratchet wheel to release both clamps, a pawl for said ratchet wheel, a finger-piece connected to said ratchet wheel, mechanism being provided to cause said pawl to turn said ratchet and lift the clamps to permit the advance of the sheets, and means to trip the pawl to cause the remaining sheets in the piles to be clamped.

44. The combination with an impression cylinder and sheet-feeding devices for upper and lower piles of sheets, of clamps for the rear ends of the piles of sheets, a ratchet wheel to release both clamps, a pawl for said ratchet wheel, said clamps connected at their ends by means of a pair of vertical racks, pinions meshing with said racks, and a shaft carrying said pinions and said ratchet wheel.

45. The combination with an impression cylinder and a drive-shaft, of means for holding separate piles of sheets, means for advancing the sheets from the piles, movable flaps to press or hold back the front of the piles, gages for the rear ends of the piles, a cam on said drive-shaft, and connections between said cam and said flaps.

46. The combination with an impression cylinder and a drive-shaft, of means for holding separate piles of sheets, means for advancing the sheets from the piles, movable flaps to press or hold back the front of the piles, gages for the rear ends of the piles, a cam on said drive-shaft, connections between said cam and said flaps, said connections including a lever to ride upon the cam, links extending from said lever, and rock-shafts carrying said flaps and having arms to which said links are attached.

47. The combination with an impression cylinder and a drive-shaft, of means for holding separate piles of sheets, means for advancing the sheets from the piles, movable flaps to press or hold back the front of the piles, gages for the rear ends of the piles, a cam on said drive-shaft, connections between said cam and said flaps, said connections including a lever to ride upon the cam, links extending from said lever, rock-shafts carrying said flaps and having arms to which said links are attached, and a spring or springs to swing said flaps away from the piles of sheets.

48. The combination with an impression cylinder, and a drive shaft, of a duplex sheet-feeding mechanism connected thereto, including movable flaps one for each pile of sheets to be fed, to press or hold back the fronts of the piles, and means connected to said drive-shaft to operate said flaps.

49. The combination with an impression cylinder and a drive-shaft, of a duplex sheet-feeding mechanism including flaps to press or hold back the fronts of the piles of sheets to be fed, said flaps mounted on rock shafts, a cam connected to said drive shaft, a lever to ride upon said cam, and links extending from said lever to arms upon said rock shafts to rock the latter.

50. The combination with a stenciling machine including a stencil cylinder and a pressure roll to press the sheets against the cylinder, of an interleaving sheet-feeding mechanism operatively connected to the stencil cylinder and including a pair of feeding rolls and means to release one roll of said pair from the other, to receive the leading edge of the interleaving sheet, and then to cause the rolls to bite and advance the interleaving sheets.

51. The combination with a stenciling machine including a stencil cylinder and a pressure roll to press the sheets against the cylinder, of an interleaving sheet-feeding mechanism operatively connected to the stencil cylinder and including a pair of feeding rolls and means to release one roll of said pair from the other, to receive the leading edge of the interleaving sheet, and then to cause the rolls to bite and advance the interleaving sheets, one of the rolls of said pair running in contact with said pressure roll.

52. The combination with a stenciling machine including a stencil cylinder and a pressure roll to press the sheets against the cylinder, of an interleaving sheet-feeding mechanism operatively connected to the stencil cylinder and including a pair of feeding rolls and means to release one roll of said pair from the other, to receive the leading edge of the interleaving sheet, and then to cause the rolls to bite and advance the interleaving sheets, the movable roll in said pair of rolls being mounted upon a feeding table and the latter having means for moving it away from the other of said pair of feeding rolls.

53. The combination with a stenciling machine including a stencil cylinder and a pressure roll to press the sheets against the cylinder, of an interleaving sheet-feeding mechanism operatively connected to the stencil cylinder and including a pair of feeding rolls and means to release one roll of said pair from the other, to receive the leading edge of the interleaving sheet, and then to cause the rolls to bite and advance the interleaving sheets, the movable roll in said pair of rolls being mounted upon a feeding table and the latter having means for moving it away from the other of said pair of feeding rolls, said feed-board moving means including a cam connected to said stencil cylinder, and a lever operated by said cam.

54. The combination with a stenciling machine including a stencil cylinder and a pressure roll to press the sheets against the cylinder, of an interleaving sheet-feeding mechanism operatively connected to the stencil cylinder and including a pair of feeding rolls and means to release one roll of said pair from the other, to receive the leading edge of the interleaving sheet, and then to cause the rolls to bite and advance the interleaving sheets, the movable roll in said pair of rolls being mounted upon a feeding table and the latter having means for moving it away from the other of said pair of feeding rolls, said feed-board moving means including a cam connected to said stencil cylinder, and a lever operated by said cam, the connection between said lever and said feed-board including a rock-shaft operated by said lever, and a cam or cams upon said rock-shaft to lift and drop said feed-board.

55. The combination with a stenciling machine including a stencil cylinder and a roll to press the sheets against the cylinder, of an interleaving sheet-feeding mechanism operatively connected to the stencil cylinder and including a pair of feeding rolls, one roll in said pair of feeding rolls being mounted upon a movable support, and means for moving said roll away from and back to the other of said pair of rolls.

56. The combination with a stenciling machine including a stencil cylinder and a roll to press the sheets against the cylinder, of an interleaving sheet-feeding mechanism operatively connected to the stencil cylinder and including a pair of feeding rolls, one roll in said pair of feeding rolls being mounted upon a movable support, and means for moving said roll away from and back to the other of said pair of rolls, one of the rolls of said pair running in contact with said pressure roll.

57. The combination with a stencil cylinder, of a pressure roll to run thereon, and duplex sheet-feeding mechanism including means to advance sheets between said stencil cylinder and said roll and also including a pair of feeding rolls, means for advancing sheets from another pile between the rolls of said pair, and means for releasing said pressure roll from said cylinder and concomitantly separating the rolls of said pair to permit the introduction of the leading edges of sheets, and then restoring the rolls to normal condition.

58. The combination with a stencil cylinder, of a pressure roll, a pair of arms on which it is mounted, means to move said arms to drop said roll, and an interleaving sheet-feeding mechanism including a pair of rolls, one of which is also mounted on said arms to run in contact with said pressure roll, means for concomitantly moving the other roll of said pair away from the first roll, and means for restoring the rolls to normal positions.

59. The combination with a stencil cylinder, of a pressure roll, a pair of arms on which it is mounted, means to cause said arms to drop and raise said roll, means to feed sheets between said roll and cylinder, and an interleaving sheet feeding mechanism including a pair of rolls, one of which is also mounted on said arms to run in contact with said pressure roll, and the other of which is mounted upon a movable feeding table, means being connected to said cylinder for moving said feeding table with its roll away from the other of said pair of feeding rolls.

60. The combination with a stencil cylinder, of a pressure roll, a pair of arms on which it is mounted, means to cause said arms to drop and raise said roll, means to feed sheets between said roll and cylinder, and an interleaving sheet feeding mechanism including a pair of rolls, one of which is also mounted on said arms to run in contact with said pressure roll, and the other of which is mounted upon a movable feeding table, a cam connected to the stencil cylinder, a lever operated by said cam, a link or bar operated by said lever, and two rock shafts operated by said link or bar, one of said rock shafts having a cam to throw off and on said pressure roll, and the other of said rock shafts having a cam to move up and down said feeding table with the feeding roll thereon.

61. The combination with a stencil cylinder, of a pressure roll, a pair of arms on which it is mounted, means to cause said arms to drop and raise said roll, means to feed sheets between said roll and cylinder, and an interleaving sheet-feeding mechanism including a pair of rolls, one of which is also mounted on said arms to run in contact with said pressure roll, and the other of which is mounted upon a movable feeding table, a cam connected to the stencil cylinder, a lever operated by said cam, a link or bar operated by said lever, and two rock shafts operated by said link or bar, one of said rock shafts having a cam to throw off and on said pressure roll, and the other of said rock shafts having a cam to move up and down said feeding table with the feeding roll thereon, said lever formed in two parts, and means to disconnect one part from the other to throw off said pressure roll.

62. The combination with a stencil cylinder, of a pressure roll, a pair of arms on which it is mounted, means to cause said arms to drop and raise said roll, means to feed sheets between said roll and cylinder, and an interleaving sheet-feeding mechanism including a pair of rolls, one of which is also mounted on said arms to run in contact with said pressure roll, and the other of which is mounted upon a movable feeding table, a cam connected to the stencil cylinder, a lever operated by said cam, a link or bar operated by said lever, and two rock-shafts operated by said link or bar, one of said rock shafts having a cam to throw off and on said pressure roll, and the other of said rock shafts having a cam to move up and down said feeding table with the feeding roll thereon, said lever formed in two parts, and means to disconnect one part from the other to throw off said pressure roll, said disconnecting means including a treadle and a link connecting it to a bolt slidable upon one of the lever parts to engage and disengage the other thereof, a spring being provided to cast off the pressure roll at such disengagement.

63. The combination with a stencil cylinder, a main drive shaft, a pressure roll and a sheet-feeding mechanism, of means for releasing the pressure roll once in each revolution of the cylinder, and a gage-mechanism on the delivery side of the pressure roll, including a transverse gage-bar, a rock-shaft on which it is mounted, a link connected to an arm on said rock-shaft, and a lever connected to said arm and running upon a cam provided upon the main drive shaft.

64. A duplex sheet-feeding mechanism comprising upper and lower feed boards to receive the piles of sheets, upper and lower advancing rolls for said piles, said rolls mounted to be lifted to permit the placing of fresh sheets on the boards, and gages or stops for the rear ends of the piles, the gage for the lower pile being movable to form an opening for the insertion of the sheets.

65. A duplex sheet-feeding mechanism comprising upper and lower feed boards to receive the piles of sheets, upper and lower advancing rolls for said piles, said rolls mounted to be lifted to permit the placing of fresh sheets on the boards, and gages or stops for the rear ends of the piles, the gage for the lower pile being movable to form an opening for the insertion of the sheets, and means to secure said lower gage in normal position.

66. In a stenciling or like machine, the combination of two stationary feed boards to receive piles of sheets, a revolving driver, a single carriage or actuator connected to said driver, and sheet-advancing rolls connected to said actuator to run upon the different piles of sheets concomitantly, to advance the top sheets, said rolls loosely connected to said actuator to accommodate variations in the heights of the piles as the sheets are fed therefrom.

JACOB SOKOLOV.

Witnesses:
 JOHN O. SEIFERT,
 K. FRANKFORT.